(12) United States Patent
Li et al.

(10) Patent No.: US 8,251,195 B2
(45) Date of Patent: Aug. 28, 2012

(54) BEARING

(75) Inventors: Shen-Chun Li, Taipei Hsien (TW); Shou-Kuo Hsu, Taipei Hsien (TW); Yung-Chieh Chen, Taipei Hsien (TW); Hsien-Chuan Liang, Taipei Hsien (TW); Shin-Ting Yen, Taipei Hsien (TW); Hung Chao, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 284 days.

(21) Appl. No.: 12/822,311

(22) Filed: Jun. 24, 2010

(65) Prior Publication Data
US 2011/0235956 A1    Sep. 29, 2011

(30) Foreign Application Priority Data
Mar. 29, 2010  (TW) .............................. 99109285 A

(51) Int. Cl.
*F16D 41/066*  (2006.01)
*F16D 27/01*   (2006.01)

(52) U.S. Cl. .................................. 192/45.017; 192/84.3

(58) Field of Classification Search ............. 192/45.017, 192/45.004, 45.001; 384/446
See application file for complete search history.

(56) References Cited

U.S. PATENT DOCUMENTS

| 2,300,223 A * | 10/1942 | Hottenroth, Jr. ......... 192/45.017 |
| 2,583,843 A * | 1/1952 | Herrick ..................... 192/45.017 |
| 5,441,130 A * | 8/1995 | Ha ............................. 188/82.84 |
| 2002/0005325 A1 * | 1/2002 | Yamada ......................... 192/38 |

* cited by examiner

*Primary Examiner* — David D Le
*Assistant Examiner* — Lillian Nguyen
(74) *Attorney, Agent, or Firm* — Altis Law Group, Inc.

(57) ABSTRACT

A bearing includes a main body, a plurality of first magnetic members, a plurality of second magnetic members, and a plurality of friction members. The main body defines a pivot hole, and a plurality of first receiving portions and a plurality of second receiving portions around the pivot hole. Each of the second receiving portions defines a cutout. The first magnetic members are received in the first receiving portions. The second magnetic members together with the friction members are received in the second receiving portions, thus generating a repelling force between the first magnetic members and the second magnetic members to impel the friction members to partially extend out of the cutouts.

20 Claims, 5 Drawing Sheets

BEARING

BACKGROUND

1. Technical Field

The present disclosure relates generally to bearings and, more particularly, to a bearing for a computer.

2. Description of Related Art

Referring to FIG. 5, a bearing 10 includes a main body 11 and a rotating assembly 12 sleeved on and fixed to the main body 11. The main body 11 defines a pivot hole (not labeled), in which a transmission shaft 13 is received. A sidewall defining the pivot hole defines three receiving grooves 112. An inner surface of each receiving groove 112 defines a through hole 113 throughout the main body 11. A sliding member 114 is slidably received in each receiving groove 112, and a spring 115 is positioned in each through hole 113. A wedge block 116 and a sleeve 117 are connected to opposite ends of each spring 115 respectively. The sleeve 117 resists the sliding member 114 to the inner surface of the receiving grooves 112 driven by the elastic force of the spring 115. When the main body 11 rotates together with the rotating assembly 12, a friction force is generated between the sliding member 114 and the transmission shaft 13, thereby driving the transmission shaft 13 to rotate.

However, the springs 115, the wedge blocks 116, the sleeves 117 and the sliding members 114 are arranged radially, thus the bearing 10 is relatively large.

Therefore, there is room for improvement within the art.

BRIEF DESCRIPTION OF THE DRAWINGS

The components in the drawings are not necessarily drawn to scale, the emphasis instead placed upon clearly illustrating the principles of the present disclosure. Moreover, in the drawings, like reference numerals designate corresponding parts throughout the several views.

DETAILED DESCRIPTION

Figure 1:
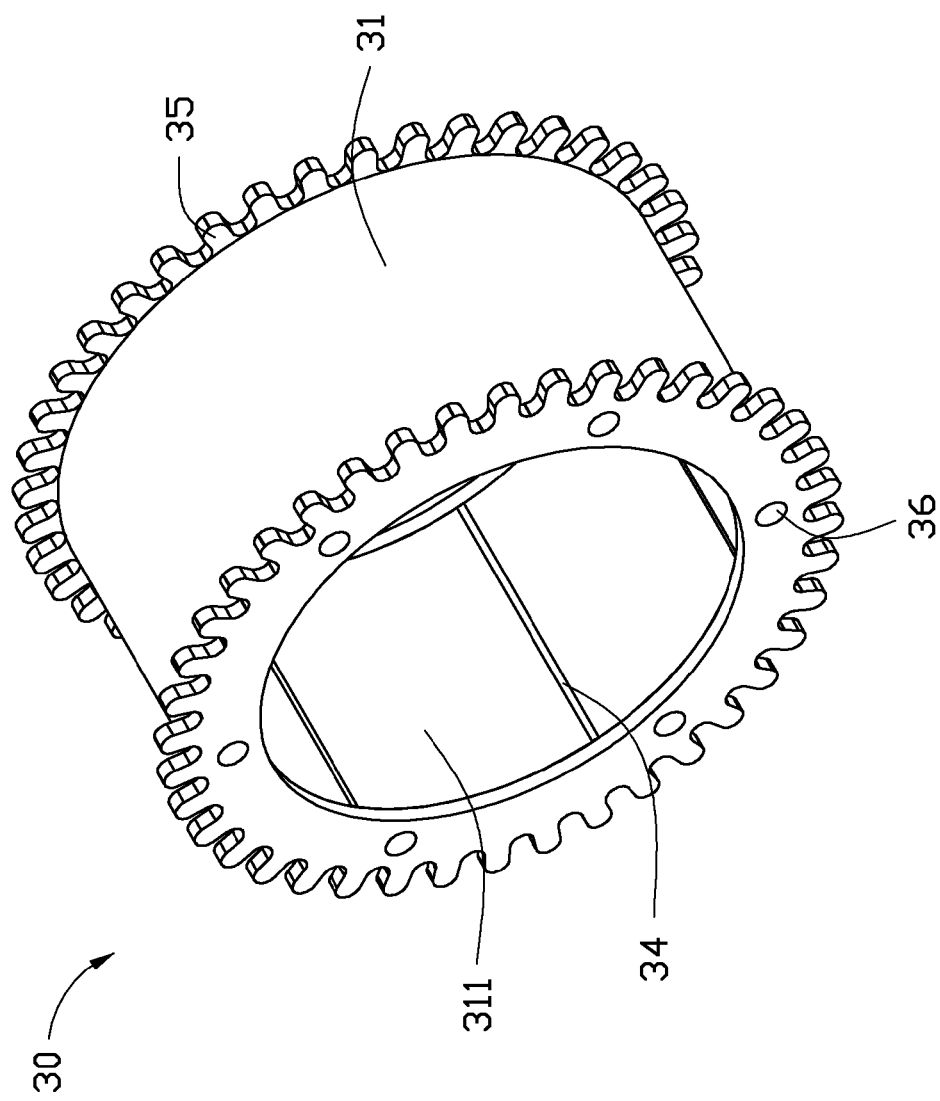
FIG. 1 is an isometric view of an embodiment of an bearing.
Figure 2:
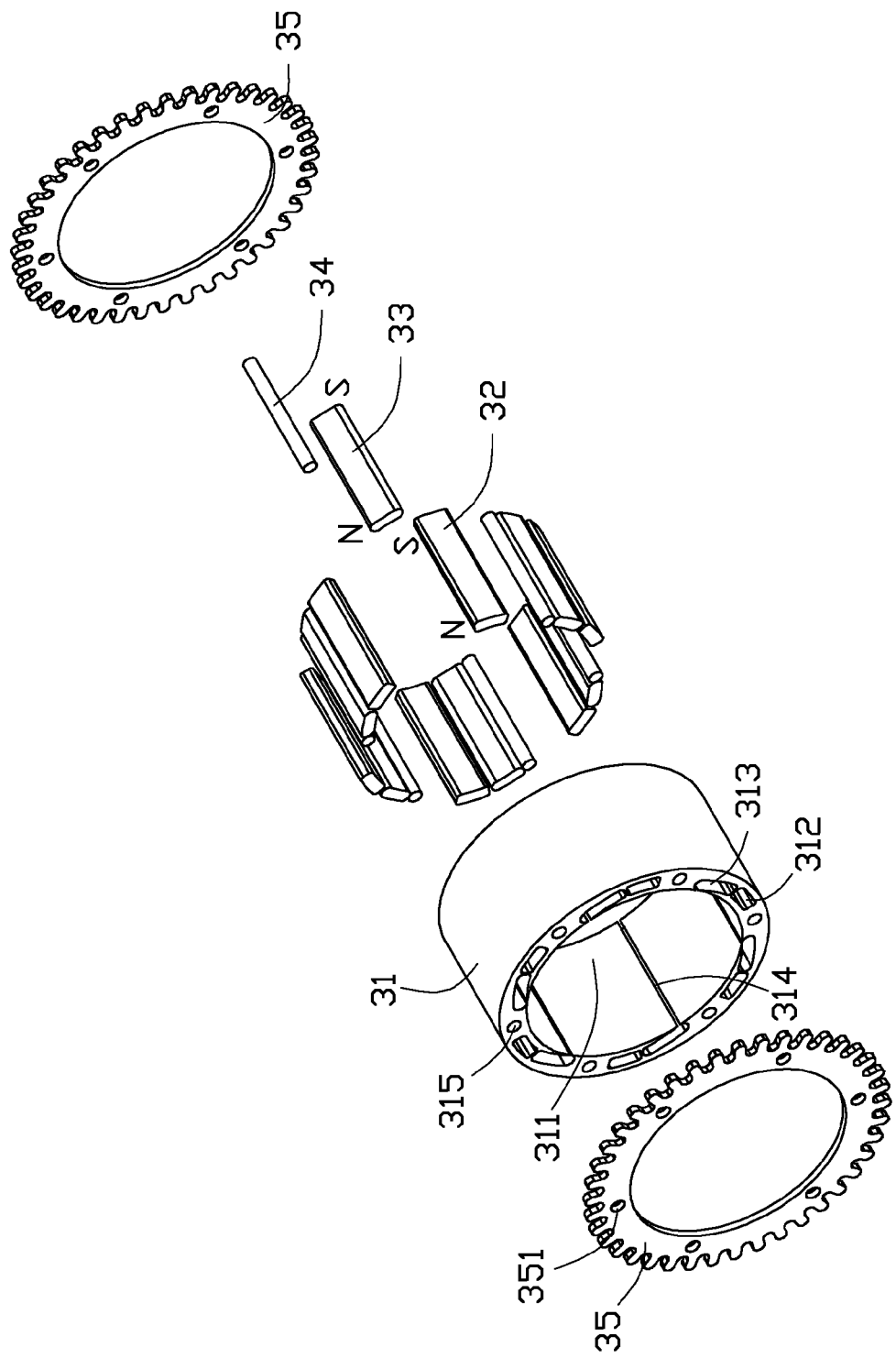
FIG. 2 is an exploded, isometric view of the bearing of FIG. 1 without fixing members.

Referring to FIGS. 1 and 2, an embodiment of a bearing 30 includes a main body 31, a plurality of first magnetic members 32, a plurality of second magnetic members 33, a plurality of friction members 34, two gears 35, and a plurality of fixing members 36.

The main body 31 defines a circular pivot hole 311 in a center, and includes a plurality of first receiving portions 312 and second receiving portions 313 around the pivot hole 311. Each first receiving portion 312 is adjacent to one corresponding second receiving portion 313. Each second receiving portion 313 defines a cutout 314 communicating with the pivot hole 311. In the illustrated embodiment, the main body 31 is substantially cylindrical, and defines six first receiving portions 312 and six second receiving portions 313. The main body 31 further defines a plurality of fixing holes 315 between the first receiving portions 312 and the second receiving portions 313.

The first magnetic members 32 and the second magnetic members 33 are substantially rectangular elongated bars, with a north pole and a south pole on opposite ends. The friction members 34 are substantially cylindrical. The first magnetic members 32 are snugly received in the first receiving portions 312. One second magnetic member 33 together with one friction member 34 is received in one corresponding second receiving portion 313. The friction member 34 is positioned at a side of the second receiving portion 313 defining the cutout 314. When the second magnetic member 33 and the friction member 34 are received in the second receiving portion 313, the second receiving portion 313 also has some free space. That is, a sum volume of the second magnetic member 33 and the friction member 34 is less than a volume of the second receiving portion 313. The north pole of the first magnetic members 32 and the north pole of the second magnetic member 33 are located on a same end of the main body 31, and the south pole of the first magnetic members 32 and the south pole of the second magnetic member 33 are located on the other end of the main body 31, thereby generating a repelling force to impel the friction member 34 to, and partially extend out of the cutout 314. In the illustrated embodiment, the first magnetic members 32 and the second magnetic members 33 are electromagnets.

Each gear 35 defines a connecting hole 351. The fixing members 36 extend through the connecting holes 351 of the gear 35 and are received in the fixing holes 315 of the main body 31, to fix two gears 35 on opposite ends of the main body 31.

Figure 3:
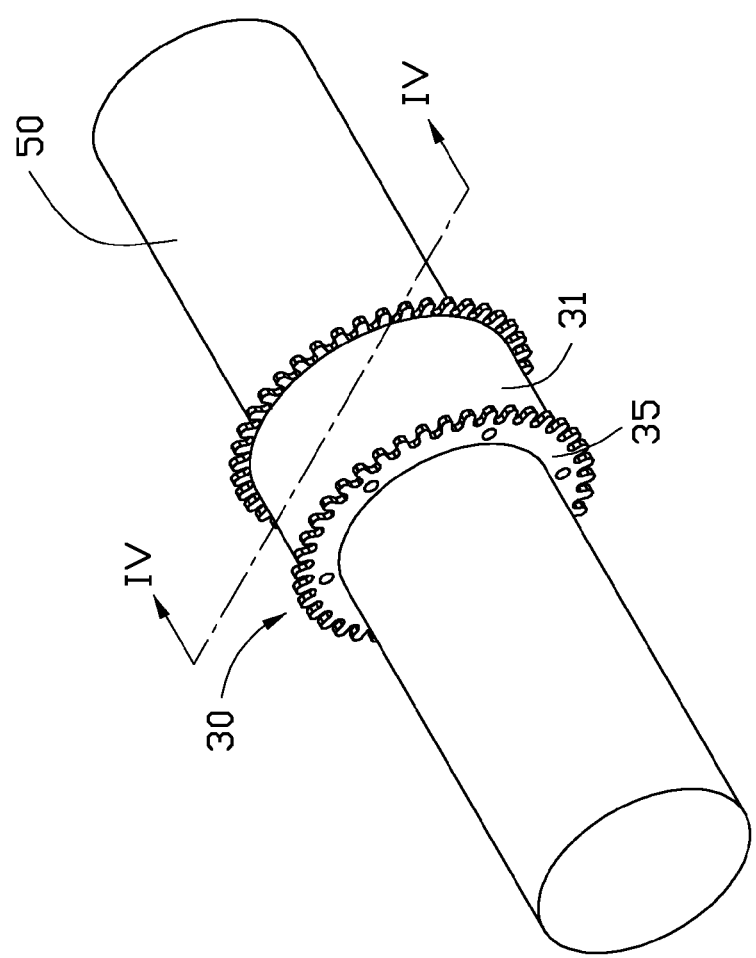
FIG. 3 is an isometric view of the bearing of FIG. 1 sleeved on a transmission shaft.
Figure 4:
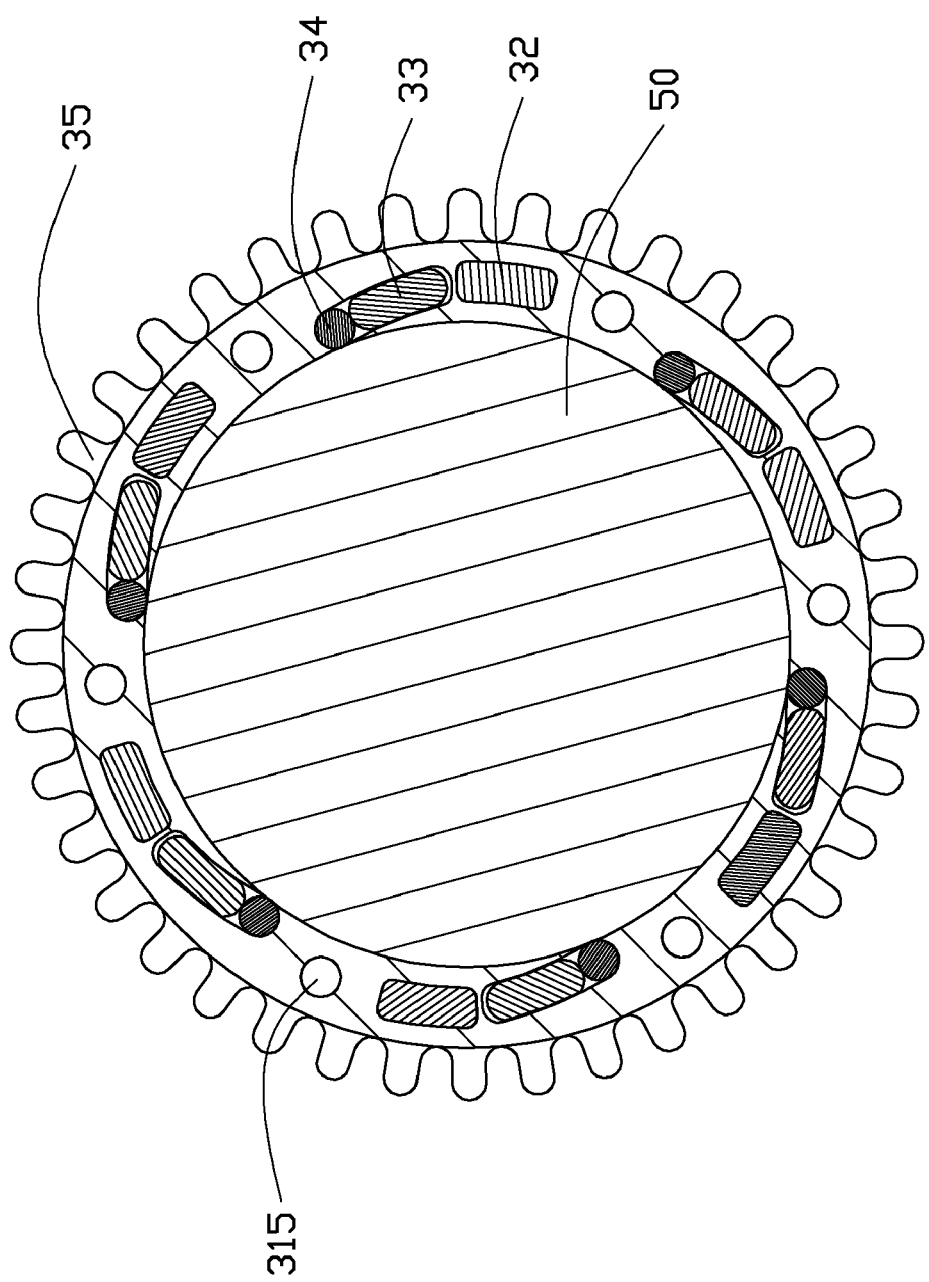
FIG. 4 is a cross-section of the bearing and the transmission shaft of FIG. 3, taken along the line IV-IV.
Figure 5:
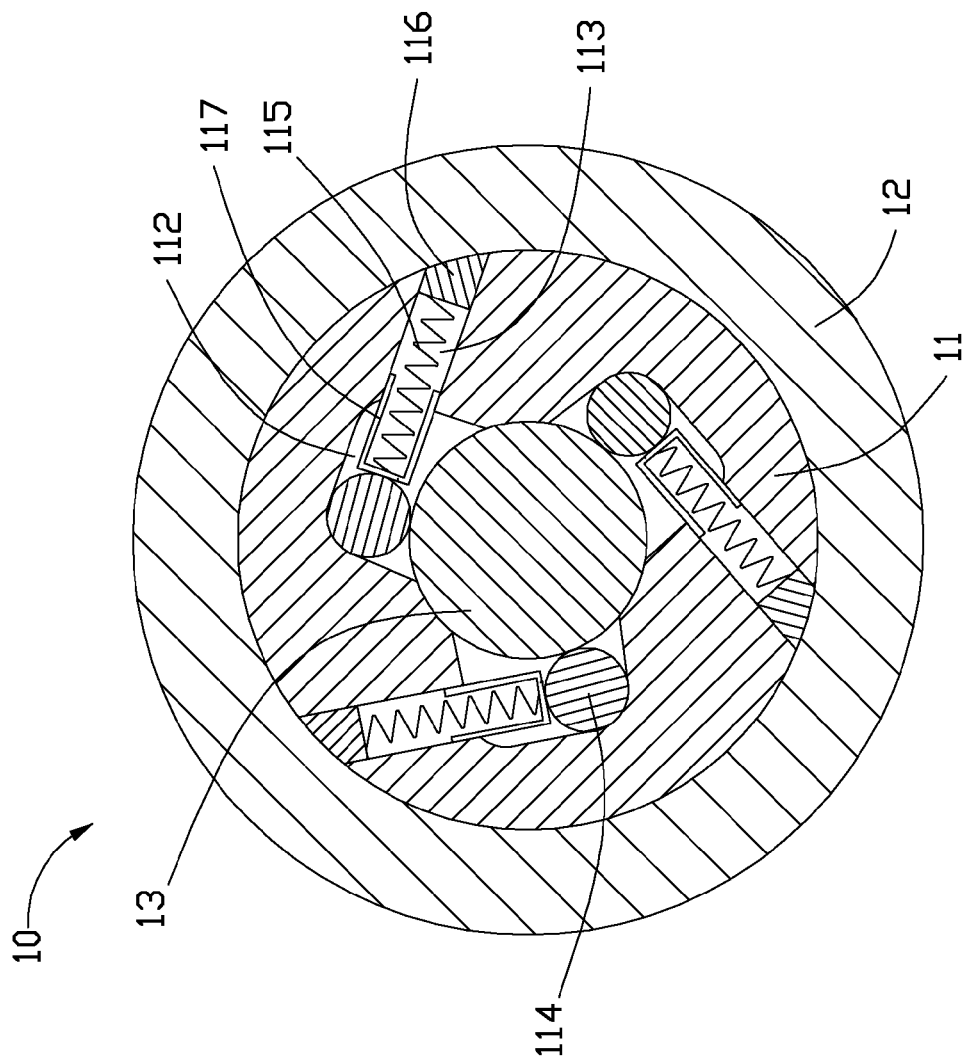
FIG. 5 is a cross-section of a conventional bearing.

Referring to FIGS. 2 through 4, in use, a transmission shaft 50 extends through the pivot hole 311 of the bearing 30, and parts of the friction members 34 extending out of the cutout 314 resist the transmission shaft 50. When the gears 35 are rotated by an external force, the bearing 30 rotates together with the gears 35, and a friction force is produced between the transmission shaft 50 and the friction members 34, such that the transmission shaft 50 is rotated by the friction force.

Since the first receiving portions 312 and six second receiving portions 313 are pivotally defined in the bearing 30, and the first magnetic members 32 and the second magnetic members 33 are respectively received in the first receiving portions 312 and six second receiving portions 313, the transmission shaft 50 and the friction members 34 maintain contact due to the repelling force between the first magnetic members 32 and the second magnetic members 33. There is no need to radially position elastic members in the bearing 30 to produce elastic force. Therefore, the bearing 30 can be small. Furthermore, the repelling force between the first magnetic members 32 and the second magnetic members 33 can be maintained over time, unlike the elastic members which are easily deformed. Thus, the bearing 30 provides extended service life.

It should be pointed out that the main body 31 may only pivotally define one first receiving portion 312 and one second receiving portion 313. Correspondingly, the bearing 30 has one first magnetic members 32 received in the first receiving portion 312 and one second magnetic member 33 together with one friction member 34 received in the second receiving portion 313.

It is believed that the present embodiments and their advantages will be understood from the foregoing description, and it will be apparent that various changes may be made thereto without departing from the spirit and scope of the disclosure or sacrificing all of its material advantages.

What is claimed is:

1. A bearing, comprising:
   a main body defining a pivot hole, and at least one first receiving portion and at least one second receiving portion around the pivot hole, each of the at least one second receiving portions defining a cutout ;
   at least one first magnetic member received in the at least one first receiving portion;
   at least one second magnetic member; and
   at least one friction member together with the at least one second magnetic member received in the at least one second receiving portion, thus generating a repelling force between the at least one first magnetic member and the at least one second magnetic member impelling the at least one friction member to partially extend out of the at least one cutout.

2. The bearing of claim 1, wherein the at least one first magnetic member and the at least one second magnetic member are electromagnets.

3. The bearing of claim 1, wherein the at least one first magnetic member and the at least one second magnetic member are substantially rectangular elongated bars.

4. The bearing of claim 1, wherein the north pole of the at least one first magnetic member and the north pole of the at least one second magnetic member are located on a same end of the main body, and the south pole of the at least one first magnetic member and the south pole of the at least one second magnetic member are located on another end of the main body.

5. The bearing of claim 1, further comprising two gears positioned on opposite ends of the main body.

6. The bearing of claim 5, further comprising a plurality of fixing members fixing the gears to the main body.

7. The bearing of claim 1, wherein the at least one friction member is substantially cylindrical.

8. The bearing of claim 1, wherein a total volume of one second magnetic member and one friction member is less than a volume of one second receiving portion.

9. The bearing of claim 1, wherein the at least one first magnetic member is snugly received in the at least one first receiving portion.

10. A bearing, comprising:
    a main body defining at least one cutout;
    at least one first magnetic member;
    at least one second magnetic member; and
    at least one friction member received in the main body;
    wherein the at least one friction member is connected to the second magnetic member, and corresponding to the at least one cutout, such that a repelling force is generated between the at least one first magnetic member and the at least one second magnetic member to impel the at least one friction member to partially extend out of the at least one cutout.

11. The bearing of claim 10, wherein the at least one first magnetic member and the at least one second magnetic member are electromagnets.

12. The bearing of claim 10, wherein the at least one first magnetic member and the at least one second magnetic member are rectangular elongated bars.

13. The bearing of claim 10, wherein the north pole of the at least one first magnetic member and the north pole of the at least one second magnetic member are located on a same end of the main body, and the south pole of the at least one first magnetic member and the south pole of the at least one second magnetic member are located on another end of the main body.

14. The bearing of claim 10, further comprising two gears positioned on opposite ends of the main body.

15. The bearing of claim 14, further comprising a plurality of fixing members fixing the gears to the main body.

16. The bearing of claim 10, wherein the at least one friction member is substantially cylindrical.

17. A bearing, comprising:
    a main body defining a pivot hole;
    at least one first magnetic member and at least one second magnetic member received in the main body, and alternatively arranged around the pivot hole;
    wherein at least one friction member together with the at least one second magnetic member are received in the main body, thus generating a repelling force between the at least one first magnetic member and the at least one second magnetic member impelling the at least one friction member to partially extend in the pivot hole.

18. The bearing of claim 17, wherein the at least one first magnetic member and the at least one second magnetic member are electromagnets.

19. The bearing of claim 17, wherein the at least one first magnetic member and the at least one second magnetic member are substantially rectangular elongated bars.

20. The bearing of claim 17, wherein the north pole of the at least one first magnetic member and the north pole of the at least one second magnetic member are located on a same end of the main body, and the south pole of the at least one first magnetic member and the south pole of the at least one second magnetic member are located on another end of the main body.

* * * * *